United States Patent
Tomlinson

(10) Patent No.: US 10,753,542 B2
(45) Date of Patent: Aug. 25, 2020

(54) MOBILE STORAGE AND TRANSPORTATION OF COMPRESSED NATURAL GAS

(71) Applicant: CHESTER LNG, LLC, Pittsburgh, PA (US)

(72) Inventor: Neville A. Tomlinson, Mitchellville, MD (US)

(73) Assignee: Chester LNG, LLC, Pittsburgh, PA (US)

(*) Notice: Subject to any disclaimer, the term of this patent is extended or adjusted under 35 U.S.C. 154(b) by 0 days.

(21) Appl. No.: 15/996,840

(22) Filed: Jun. 4, 2018

(65) Prior Publication Data

US 2018/0347762 A1    Dec. 6, 2018

Related U.S. Application Data

(60) Provisional application No. 62/514,132, filed on Jun. 2, 2017.

(51) Int. Cl.
*F17C 13/08* (2006.01)
*F17C 13/04* (2006.01)
(Continued)

(52) U.S. Cl.
CPC .......... *F17C 13/083* (2013.01); *F17C 13/025* (2013.01); *F17C 13/04* (2013.01); *F16K 17/02* (2013.01); *F17C 2201/0119* (2013.01); *F17C 2201/035* (2013.01); *F17C 2201/054* (2013.01); *F17C 2201/056* (2013.01); *F17C 2203/0639* (2013.01); *F17C 2203/0646* (2013.01); *F17C 2205/0107* (2013.01); *F17C 2205/0111* (2013.01); *F17C 2205/0142* (2013.01);
(Continued)

(58) Field of Classification Search
CPC ...... F17C 13/083; F17C 13/025; F17C 13/04; F16K 17/02
See application file for complete search history.

(56) References Cited

U.S. PATENT DOCUMENTS 4,422,558 A * 12/1983 Mittelmann et al. ........................ B65D 88/528 220/1.5
5,121,637 A     6/1992 Philipp et al.
(Continued)

FOREIGN PATENT DOCUMENTS

WO    2014/053376    4/2014

OTHER PUBLICATIONS

International Search Report and Written Opinion for corresponding international application No. PCT/US18/35808 dated Aug. 28, 2018.

*Primary Examiner* — Kevin L Lee
(74) *Attorney, Agent, or Firm* — Reed Smith LLP

(57) ABSTRACT

A system for the storage and transportation of high pressure compressed natural gas. The system includes a gas distribution manifold having an inlet and an outlet, wherein the inlet is configured to be connectable to a natural gas supply source, and a plurality of storage vessels in fluid communication with the distribution manifold between the inlet and the outlet. The system further includes at least one isolation valve operatively connected between the gas distribution manifold and the plurality of storage vessels, wherein the at least one the isolation valve is configured to control gas filling and discharging of the plurality of storage vessels.

3 Claims, 5 Drawing Sheets

(51) Int. Cl.
*F17C 13/02* (2006.01)
*F16K 17/02* (2006.01)

(52) U.S. Cl.
CPC .............. *F17C 2205/0146* (2013.01); *F17C 2205/0157* (2013.01); *F17C 2205/0332* (2013.01); *F17C 2221/033* (2013.01); *F17C 2223/0123* (2013.01); *F17C 2223/036* (2013.01); *F17C 2250/036* (2013.01); *F17C 2250/043* (2013.01); *F17C 2260/038* (2013.01)

(56) References Cited

U.S. PATENT DOCUMENTS

| | | | | |
|---|---|---|---|---|
| 5,385,263 | A | | 1/1995 | Kirk et al. |
| 5,803,005 | A | * | 9/1998 | Stenning et al. ....... B63B 25/12 114/72 |
| 6,339,996 | B1 | * | 1/2002 | Campbell ............. B60P 3/2205 114/74 R |
| 7,155,918 | B1 | | 1/2007 | Shivers, III |
| 8,375,876 | B2 | * | 2/2013 | Van Tassel .............. F17C 3/025 114/74 R |
| 8,607,830 | B2 | * | 12/2013 | White ....................... F17C 5/02 141/11 |
| 2016/0033082 | A1 | * | 2/2016 | Getter et al. ............ G01F 23/34 220/560.12 |

\* cited by examiner

MOBILE STORAGE AND TRANSPORTATION OF COMPRESSED NATURAL GAS

CROSS-REFERENCE TO RELATED APPLICATION

This application claims the benefit under 35 U.S.C. § 119(e) of the earlier filing date of U. S. Provisional Patent Application No. 62/514,132 filed on Jun. 2, 2017, the disclosure of which is incorporated by reference herein.

BACKGROUND

This application discloses an invention which is related, generally and in various embodiments, to the mobile storage and transportation of compressed natural gas. Natural gas use is rapidly increasing, and various methods of transporting the gas have been developed. The conventional methods of transporting natural gas in industrial quantities include (1) pipelines which transport the gas in its gaseous form at high, moderate and low pressures, (2) ships, tanker trailers, and ISO containers which transport the gas in its liquid form as liquefied natural gas (LNG), and (3) tube trailers and freight vessels which transport the gas in small (6 to 8 niches) to medium sized (10 to 18 inches) diameter tubes as compressed natural gas (CNG).

Each method of transporting natural gas has associated system design costs and other commercial cost which are contained by factors including number of gas users and user locations. Before selecting the most suitable method of transporting natural gas, an analysis is performed to evaluate the effect of the various factors on the cost of the system and ultimately the price of the gas to users. The analysis takes into consideration factors such as source gas location, distance to user location, gas capacity required, transportation cost, and government regulations.

Large diameter (24 to 36 inches), high pressure pipelines have been the major method of going large gas capacities from source to city-gates for re-distribution to users. From the city-gate, the gas is re-distributed to users via smaller diameter low pressure pipelines. In many cases pipeline gas distribution is not economical, particularly if the gas source and pipelines are located far from user locations.

Processing and transporting the gas as LNG has proven to be a more efficient method of getting large quantities of gas to distant locations where pipeline use is cost prohibitive or impractical. However, LNG production facilities can be quite expensive to construct, and require extensive training and expertise for operations. In addition, the LNG transportation systems can also prove quite expensive and these cost drivers have forced the economics around LNG use to favor large gas capacity users such as power plants and manufacturing facilities.

In some cases, transporting natural gas in its compressed form as CNG can be cost effective. This holds true when gas is needed in locations where there are no pipelines, and no access to LNG.

There are several methods and systems for transporting CNG in use today. Systems include tube trailers, marine Coselle (a trademark of SEA NG) vessels, and small capacity CNG systems serving as virtual pipelines for fuel stations. Of these, the systems used primarily to supply natural gas in industrial capacities are the Coselle systems, and the tube trailer system. The Coselle system which utilizes coiled pipes has a net gas carrying capacity of about 4.2 million standard cubic foot (set) at 4000 pounds per square inch (psi) and is specifically designed for transporting gas via marine vessels. Tube trailers typically range is gas carrying capacities as low as 10,000 scf to as high as 170,000 scf. Individual trailer tubes are typically designed to contain gas pressures of up to 3600 psi and typically vary in diameter from 6 to 18 inches. Tubes are arrayed in a tube bundle and secured onto the trailer, and are generally of similar length as the trailer. The small capacity CNG systems serving as virtual pipelines for fuel stations has gas capacities ranging from about 38,000 scf to 54,000 scf.

These CNG storage and transportation systems have proven useful, but are not without some noted drawbacks. The large capacity Coselle systems are more suited for large industrial operations and are not designed to support smaller gas capacity markets. Also, the Coselle units are designed for marine transportation and are often operated from marine vessels. Smaller capacity tube trailer CNG storage and transportation systems, designed to support smaller gas capacity markets, also have some drawbacks as well. Most notable among these include the cost of the trailer to which the tubes are secured, regardless of capacities. The cost of the trailer increases the cost of the CNG operations because the tube bundle is secured to the trailer, thus requiring a trailer for each tube bundle. Other smaller capacity CNG storage and transportation systems which do not have the drawbacks of the Coselle or the tube trailer have other drawbacks. Most noted among these is their small gas capacity, 38,000 scf to 54,000 scf. This small capacity limits their application, increases their turn-around time, and increases the cost of a CNG operation using them.

SUMMARY

Various disclosed embodiments are to an improved CNG storage and transportation system. The key benefits to the disclosed system are lower fuel capacity and increased turnaround times. Compared to the systems described above, the CNG storage and transportation system presented in this application has much lower capacity than the Cosselle system to enable land based transportation of the gas, much higher gas capacity than a comparable tube trailer system, but without the drawback of having the tubes secured to a trailer and incurring additional cost, and much higher capacity and lower turn-around time than smaller capacity system which cannot support large gas demand markets.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

Figure 1:
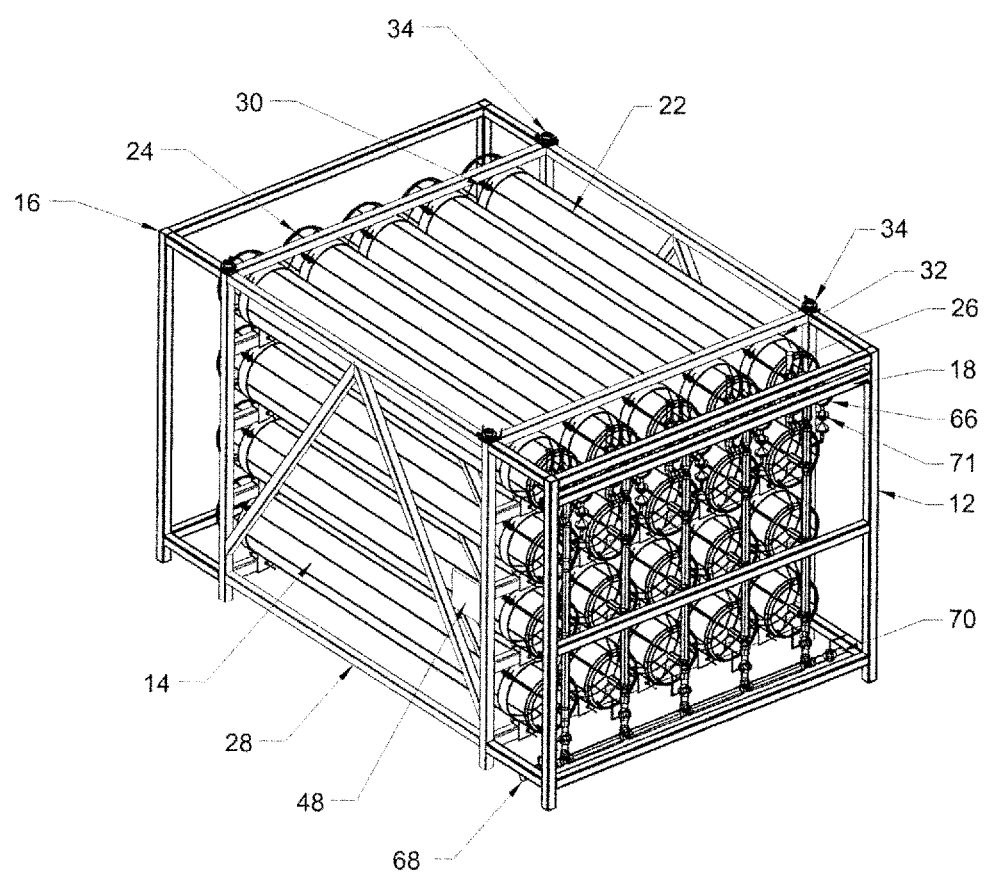
FIG. 1 illustrates a transportation and storage system without a shell enclosure according to various embodiments.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

FIGS. 1-5 illustrate various embodiments of a transportation and storage system 10. Transportation and storage system 10 may be utilized for the mobile transportation of compressed natural gas (CNG) in medium (10 to 18 inches) to large (18 to 24 inches) diameter tubes. Transportation and storage system 10 includes one or more transportation and storage modules 12. Transportation and storage modules 12 are not affixed to a truck or trailer, but each is a standalone array of pressure vessels or tubes 14 designed and arranged for storing high pressure CNG for transportation by any suitable method including tractor trailers, train or ship as freight.

Each transportation and storage module 12 is sized such that it can supply gas to domestic, commercial, and industrial applications. The gas storage capacity of each transportation and storage module 12 ranges from 86,600 scf up to 120,000 scf and gas pressures from 3600 psi up to 7000 psi. The larger capacity 120,000 scf design can supply the gas required to support 41 homes using an average of 900 kWh per month, or a 1000 kW boiler for 36 hours of operations.

Each transportation and storage module 12 is sized in dimensions and weight such that up to three or four transportation and storage modules 12 can be loaded onto a standard trailer truck (FIG. 5) for transportation to the point where the gas is needed. Transportation and storage modules 12 dimensions vary, but overall dimensions for the standard 86,600 scf design are approximately 10 to 12 feet long by 7 to 9.0 feet wide by 8 to 9.0 feet high.

Figure 2:
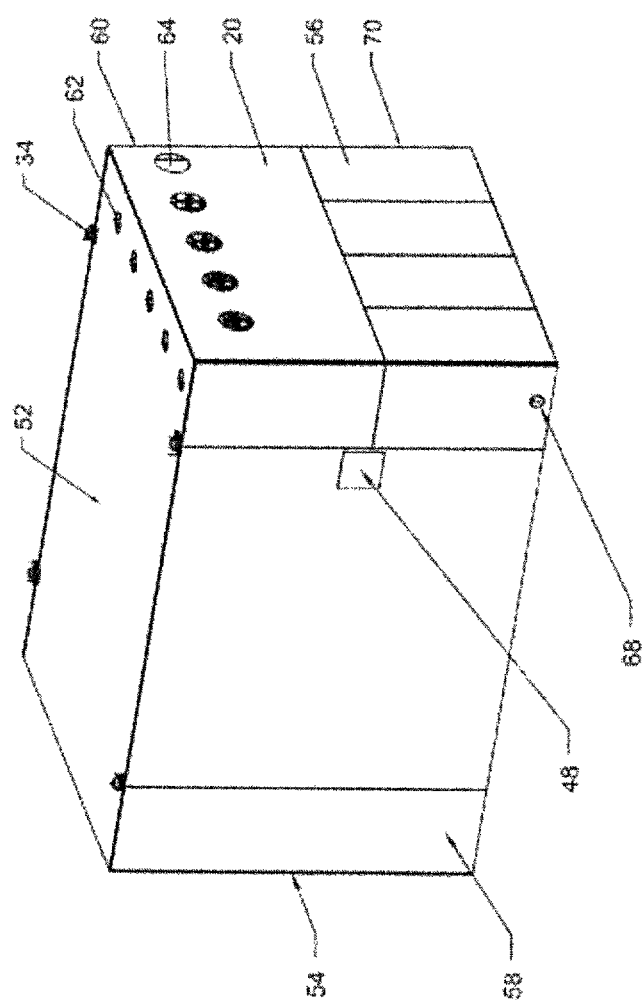
FIG. 2 illustrates the transportation and storage system with a shell enclosure according to various embodiments.

Referring to FIGS. 1 and 2, each transportation and storage module 12 is cuboid in shape and includes a front end 16 and a rear end 18. FIG. 1 shows the transportation and storage module 12 with an exterior cuboid-shaped shell enclosure 20 removed, while FIG. 2 shows the transportation and storage module 12 including the exterior shell enclosure 20. Referring to FIG. 1, each transportation and storage module 12 includes vertical arrays 22 of vessels 14. Each vertical array 22 includes a number, in this case four, of parallel vertically spaced bulk storage vessels 14. In the illustrated embodiment, each transportation and storage module 12 includes a number, in this case five, horizontally spaced side-by-side vertical arrays 22. Other numbers of vertical arrays 22 and/or vessels 14 in the vertical arrays 22 may be provided dependent on the required, need. Each vessel 14 has a front end 24 and a rear end 26. Vessels 14 are securely anchored to a lightweight frame 28. Frame 28 includes a plurality of horizontal and vertical cross bars having a hollow interior portion in which the vertical arrays 22 are disposed. The front end 24 of each vessel 14 is held in place to frame 28 by front module clamps 30, and the rear end 26 of each vessel 14 is held in place by rear module clamps 32. Additionally, universal lift lugs 34, in the case four, are attached to the top of frame 28 to accommodate lifting and handling operations.

Figure 3:
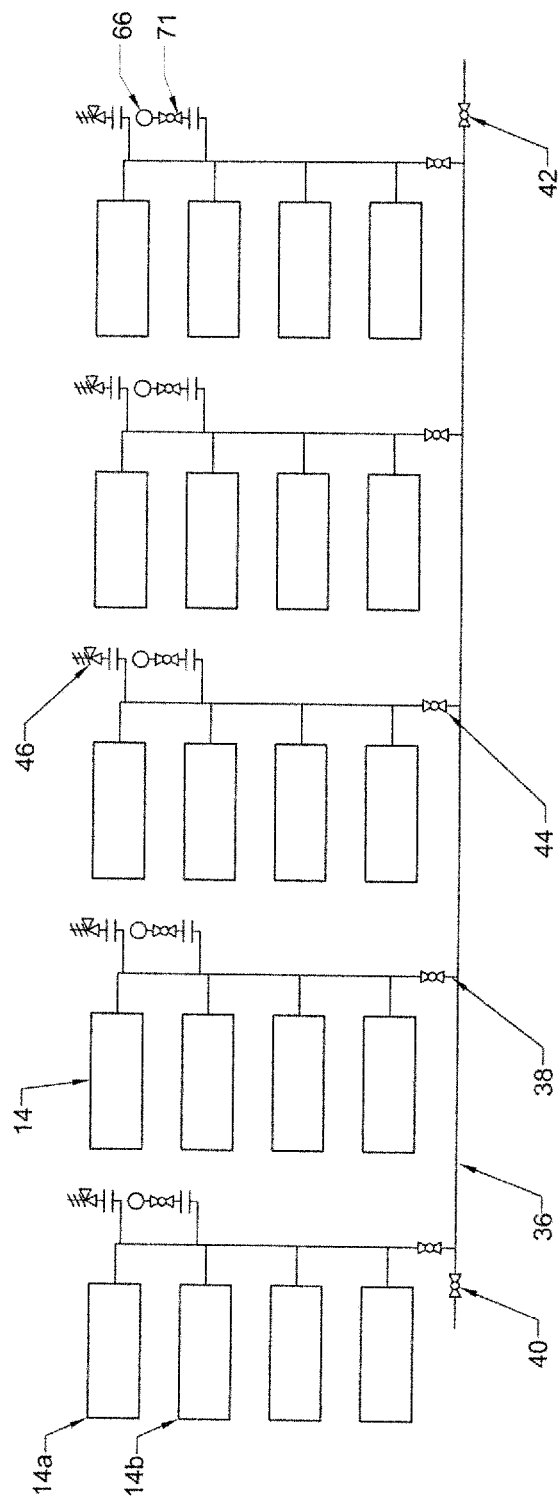
FIG. 3 illustrates a schematic view of the transportation and storage system according to various embodiments.

Referring to FIG. 3, each transportation and storage module 12 includes a gas distribution manifold 36 having a number of branch pipes or connections 38 each connecting distribution manifold 36 with a respective vertical array 22. Distribution manifold 36 has a gas inlet valve 40 and a gas outlet valve 42. When gas outlet valve 42 is closed, gas enters gas inlet valve 40 to fill vessels 14 via manifold 36 and branch connections 38. The branch connections 38 are fitted with vessel isolation valves 44 to control filling of each vertical array 22 in order to provide operators the flexibility to determine the manner in which vessels 14 are filled and discharged. When gas outlet valve 42 is open and gas inlet valve 40 is closed, gas may be discharged from transportation and storage module 12.

Each branch connection 38 is fitted with a pressure gauge 66 and a pressure relief valve 46 disposed between the next to last valve 14B and the last vessel 14A of the branch connection 38 and a respective vessel isolation valve to protect against over pressurization of the vessels 14. FIG. 3 is a schematic drawing showing how the pressure relief valves 46 are operatively connected to the vessels 14. A gas detection and alarm instrument panel system 48 is mounted on transportation and storage module 12 to notify operators in the event of a gas leak from the system. The instrument panel 48 is mounted such that its face is flush with the outside surface of the shell 20 (FIG. 2) Specifically, instrument panel 48 is secured to the frame 28 and installed such that its face is flushed with the shell. A rectangular opening is provided in the shell 20 to allow access to the instrument panel 48. The gas detection system is mounted into the panel 48 and is a self-contained, stand alone, vendor provided system with sensors and an audible alarm module. The system provides a digital readout of the gas concentration in the shell 20 (FIG. 2) in the event of a gas leak, and a system enable and disable push button.

Figure 4:
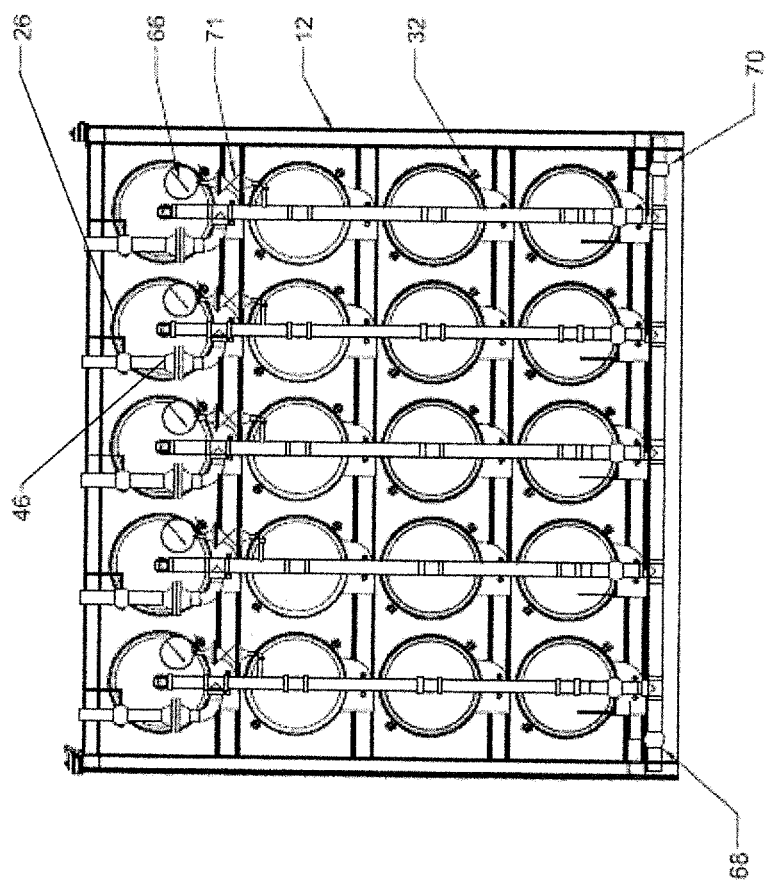
FIG. 4 is an end view of the transportation and storage system with a shell enclosure according to various embodiments.
Figure 5:
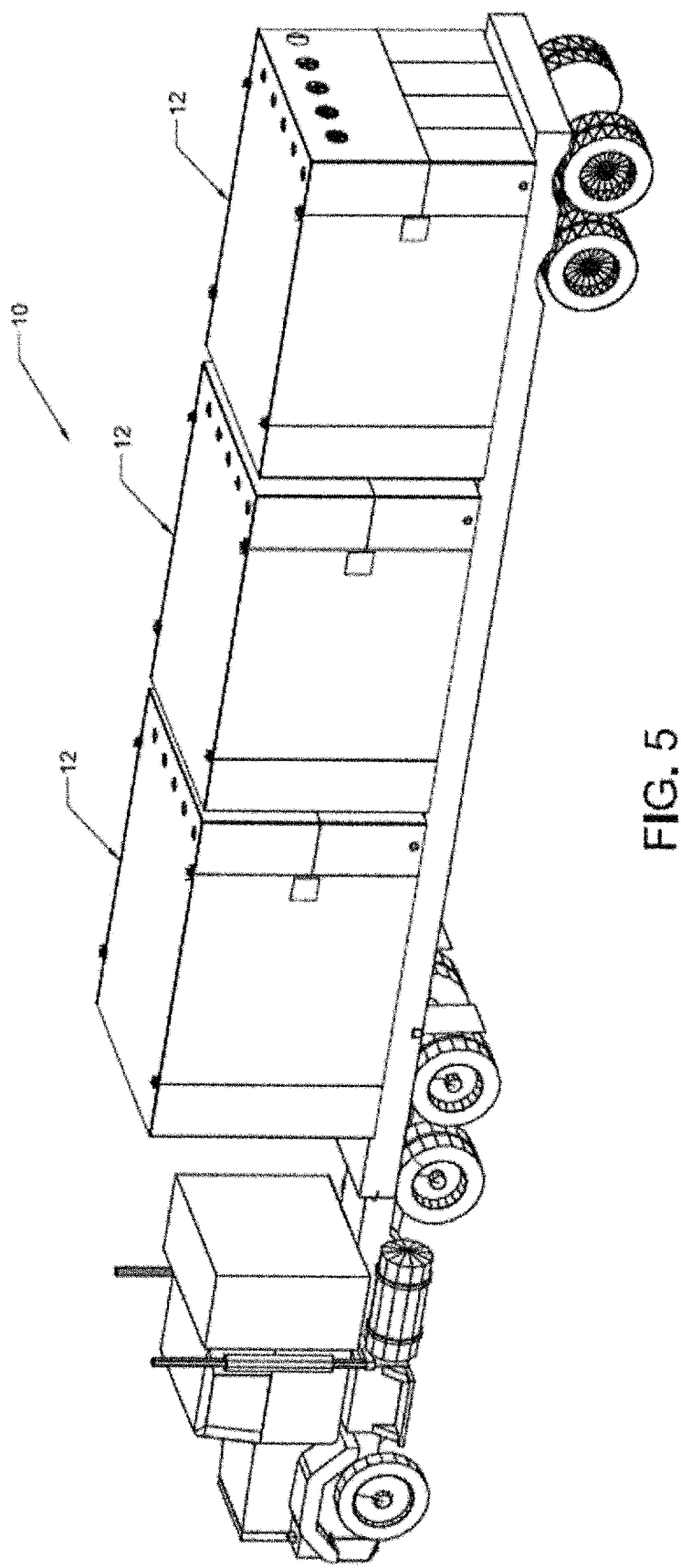
FIG. 5 is a perspective view of a truck trader carrying three transportation and storage modules according to various embodiments.

Referring to FIG. 2, the sides and the top of each transportation and storage module 12 are covered with the exterior shell enclosure 20 of, for example, metal sheeting. Shell enclosure 20 includes a top side 52, and a front end side 54, a rear end side 56, an inlet side 58 and an outlet side 60. A number of pressure relief holes 62, in this case five corresponding to the number of vertical arrays 22, are provided in the top side 52 to permit discharge of pressure relief valves 46 to the atmosphere in a fire or hazard event. A number of access holes 64, in this case five corresponding to the number vertical arrays 22, are provided for observing pressure gauges 66 (FIG. 4). An isolation valve 71 is provided downstream of each pressure gauge 66 and is a manual on/off ball or gate that serves to facilitate changing or repairing of pressure gauge 66. FIG. 3 is a schematic drawing showing how the pressure relief valves 46 are operatively connected to the vessels. Inlet side 58 of shell enclosure 20 includes an inlet opening 68 providing access to the inlet end 72 of gas distribution manifold 36 into which gas is admitted into the manifold 36. Inlet end 72 is in fluid communication with a natural gas supply source. Outlet side 60 of shell enclosure 20 includes an outlet opening 70 providing access to an outlet end 74 of gas distribution manifold 36 from which gas is discharged from gas distribution manifold 36.

Designed to be of metal construction, the transportation and storage module 12 is made of steel and/or alloy aluminum. The vessels 14 are made of steel and or aluminum, the structural frame 28 is made of square section hollow steel, and the shell enclosure 20 is made from galvanized sheet steel.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A system for the storage and transportation of compressed natural gas comprising:
    a gas distribution manifold having an inlet and an outlet, wherein the inlet is configured to be connectable to a natural gas supply source;
    a plurality of storage vessels in fluid communication with the distribution manifold between the inlet and the outlet; and
    at least one isolation valve operatively connected between the gas distribution manifold and the plurality of storage vessels, wherein the at least one isolation valve is configured to control gas filling and discharging of the plurality of storage vessels;
    wherein the plurality of storage vessels comprises a plurality of horizontally spaced vertical arrays of storage vessels, wherein each vertical array of storage vessels comprises a plurality of vertically spaced storage vessels;
    a plurality of branch connection pipes, wherein each branch connection pipe is configured to fluidly connect the gas distribution manifold and the storage vessels in one of the vertical arrays of storage vessels;
    wherein each isolation valve is operatively disposed on one of the branch connection pipes and is configured to isolate the storage vessels in one of the vertical arrays of storage vessels from the gas distribution manifold;
    a pressure relief valve and a pressure gauge operatively disposed on each branch connection pipe, wherein each pressure relief valve is configured to relieve pressure in the storage vessels in the vertical array fluidly connected to the distribution manifold by the branch connection pipe in response to a reading of the pressure gauge;
    a structural frame configured to support the plurality of storage vessels;
    wherein the structural frame is made from metal, and is configured for lifting of the structural frame;
    further comprising a shell enclosure for covering the structural frame, the plurality of storage vessels, gas distribution manifold and branch connection pipes;
    wherein the shell enclosure comprises metal sheeting, and wherein the shell enclosure is cuboid-shaped; and
    further comprising an instrument panel mounted on the structural frame, and mounted to be flush with an outside surface of the shell enclosure.

2. The system of claim 1, wherein the shell enclosure includes at least one pressure relief hole configured to permit pressure discharge.

3. The system of claim 2, wherein the shell enclosure includes at least one access hole, wherein each access hole is configured to allow access to one of the pressure gauges.

* * * * *